United States Patent [19]

de Cortanze

[11] 4,265,329
[45] May 5, 1981

[54] FRAMELESS MOTORCYCLE

[76] Inventor: André de Cortanze, 35 Allee des Graviers, 91010 Chevry 2, France

[21] Appl. No.: 12,457

[22] Filed: Feb. 15, 1979

[30] Foreign Application Priority Data

Feb. 24, 1978 [FR] France .................... 78 05284
Dec. 29, 1978 [FR] France .................... 78 36813

[51] Int. Cl.³ .................... B62K 25/16; B62K 25/20
[52] U.S. Cl. .................... 180/219; 280/275; 280/284
[58] Field of Search ............ 180/219, 226, 227, 228, 180/229, 230, 231; 280/275, 277, 96.3, 661, 284, 283

[56] References Cited

U.S. PATENT DOCUMENTS

| 2,544,331 | 3/1951 | Kogstrom | 280/661 |
| 3,521,904 | 7/1970 | Sheffer | 180/219 |

FOREIGN PATENT DOCUMENTS

| 918188 | 9/1954 | Fed. Rep. of Germany | 180/219 |
| 555975 | 9/1943 | United Kingdom | 280/283 |
| 833741 | 4/1960 | United Kingdom | 280/277 |

*Primary Examiner*—John A. Pekar
*Attorney, Agent, or Firm*—Burgess, Ryan and Wayne

[57] ABSTRACT

A two-wheeled vehicle, such as a motor bicycle is constituted by three self-contained sub-assemblies which are linked to each other and which consist of a central sub-assembly comprising a motor and a gear-box, a front sub-assembly comprising the front wheel of the vehicle, steering elements for said front wheel and front wheel braking means, and a rear sub-assembly comprising the rear wheel of the vehicle, a rear wheel suspension and rear wheel braking means, said front and rear sub-assemblies being connected to each other by said central sub-assembly to which they are directly attached.

9 Claims, 6 Drawing Figures

FRAMELESS MOTORCYCLE

BACKGROUND OF THE INVENTION

The present invention is related to a two-wheel vehicle, such as a motor bicycle.

One important feature of the vehicle, or motor bicycle according to this invention resides in the fact that its motor constitutes the frame of the vehicle and thus forms an organ adapted to transmit directly the static and dynamic forces between the front part and the rear part of the vehicle. Due to the fact that the conventional frame structure is no longer used in the novel vehicle, the weight of the latter is considerably reduced and its centre of gravity is lowered to an extent unknown in the prior art.

The front suspension of a motor bicycle according to the invention has a substantially quadrilateral shape, the four corners of which are defined by the ends of two arms hingedly connected by one of their respective ends to a plate integral with the motor, while the other end of each arm is hingedly connected to a triangular piece or element supporting the axle of the front wheel.

More particularly, said two arms are both pivotally connected to said plate by means of pivots perpendicular to the plate, and to said triangular element by means of pivots adapted to permit the angular motion of said triangular element about a common axis of said pivots, the latter being furthermore mounted on ball-and-socket joints so as to be able to swing or oscillate, in response to the displacement of the suspension, about an axis pasing through the centre of each ball-and-socket joint and perpendicular to the plane of displacement which contains the said corners of the quadrilateral. The lengths and the initial position of the sides of said quadrilateral determine the shape of the curve defined, during the displacement of the front suspension, by the centre of the front wheel in a geometrical vertical plane which also encompasses the centre of the rear wheel. When suitable parameters have been chosen, it is possible to center the above-mentioned curve with respect to the rear-wheel centre. Thus the wheel-base of the vehicle, which is equal to the distance between the wheel centres, is constant. Due to this arrangement, and due to other features which will be described in detail hereinafter, the vehicle is maintained in a substantially perfect horizontal position during braking, whereby the so-called "salutation reaction" is efficiently avoided.

It is furthermore possible to adjust the suspension, due to the fact that the upper one and/or the lower one of the above-mentioned arms are connected, respectively, to the pivots, by means of screws and bolts which allow the length of the arms to be varied.

The front suspension of the motor bicycle or similar vehicle is maintained in the desired position by a damping spring attached by one of its ends to the lower arm and by its other end to an upwardly extending beak formed by the plate. It will be understood that by appropriately selecting the length of the spring and the location of the point of connection or attachment of its lower end, it is possible to adjust the height of the centre of gravity within extremely wide limits. Consequently the principle of the invention can be applied to any type of vehicle, especially motor bicycles, whether they are designed for purposes of competition, sport, ordinary use, or whether they are meant to be used on tracks, on the road or on rough ground.

The steering assembly of the motor bicycle according to the invention comprises a handle-bar, a bracket having a vertical rod which is rotatably mounted in a tube supported by a tripod integrally mounted on the motor, on the upper side thereof, a substantially vertically extending control rod connected by universal joints to said bracket, on the one hand, and, on the other hand, to the end of one arm of an angle-piece the other arm of which forms a fork, a link member provided at each one of its ends with an eye, the inside of each eye being provided with a ball-and-socket-joint bushing and connected to a pivot extending through a fork located at the end of a lever integral with the triangular element. It is obvious that any one of the elements constituting this steering assembly may be provided with clearance increasing or compensating means known *per se* adapted to allow any appropriate adjustment to be effected.

It will also be noted that it is also possible, to simplify the steering assembly by aligning the tube, in which the above-mentioned bracket is rotatably mounted, on the axis of the control rod, whereby the uppermost universal joint becomes unnecessary and can thus be omitted. The steering is then rendered still smoother and more precise.

According to one feature of the invention, the triangular element supports a brake control device provided with a disc located in the median plane of the front wheel. Such arrangement is rendered possible by the fact that the front wheel is mounted in an cantilevered manner and that the wheel-disc can be dished on the side opposite to the suspension. This arrangement is highly advantageous in that it suppresses any dissymmetry of the reactions during braking and it renders unnecessary any reflex of the user with a view to correcting the trajectory of the vehicle while actuating the front wheel brake.

Thus the front wheel suspension is associated both to a steering assembly and the front-wheel braking means, the thus associated elements constituting a self-contained front sub-assembly wherein the forces and effects of interaction are fully withstood and balanced.

Similarly the rear part of the vehicle is also constituted by a self-contained sub-assembly capable of withstanding by itself the various forces acting on, and transmitted by, the elements of this rear sub-assembly comprising the rear-wheel proper, the rear-wheel suspension and the rear-wheel braking means, said suspension comprising a fork the arms of which are connected, on the one hand, to the hub of the wheel and, on the other hand, to a connecting piece adapted to attach the rear sub-assembly to the motor.

The rear part of the vehicle also presents the advantages brought about by the invention due to the fact that the fork which supports the rear wheel is substantially H-shaped, two arms of said fork being connected to linking pieces integral with the motor, or to bosses provided on the motor, while the other two arms of said H-shaped fork support the rear wheel hub.

In one embodiment of the invention the rear wheel suspension comprises a damping spring having an upper end connected to the top end of the connecting piece integral with the motor, and a lower end connected to one end of an arm the other end of which is hingedly connected to the bottom end of said connecting piece, said damping spring being furthermore connected to one end of a rod member, the other end of which is attached to the fork.

With a view to further reducing the so-called "salutation reaction," the lower end of the damping spring is attached through another rod member to a beak extending forwardly from the plate supporting the disc brake, said plate being mounted so as to be able to rotate about the rear wheel hub. Thus whenever the rear wheel brake is actuated, said rod member, on the one hand, limits the amplitude of the rearward displacement of the brake support and, on the other hand, acts on the lowermost attachment point of the spring so as to compress the same, whereby the suspension is "stiffened." In this respect it will also be understood that by conveniently selecting the various parameters, such as the length of the rod members and the location of the attachment points, the braking reaction effect exerted on the suspension can be varied.

Thus the motor bicycle according to the invention is novel in that it is constituted by the combination of three self-contained sub-assemblies, namely: a central sub-assembly comprising the motor and a gear-box, a front sub-assembly comprising the front wheel, guiding elements for said front wheel, the front wheel suspension braking means associated with the front wheel and steering means associated with the front wheel, and a rear sub-assembly comprising the rear wheel, the suspension associated therewith and braking means for said rear wheel, the front sub-assembly and the rear sub-assembly being connected to each other by the central sub-assembly to which they are directly attached.

In one embodiment of the invention the front sub-assembly comprises guiding elements having substantially the shape of quadrilateral the four corners of which are defined by the ends of two arms, one of their respective ends is hingedly connected to a linking plate attached to the central sub-assembly, while said two arms are connected at their other ends by ball-and-socket joints to a triangular piece which supports the axle of the front wheel.

In another embodiment the front wheel suspension is maintained in its desired position by a damping spring one end of which is attached to the lower arm of the front sub-assembly, the other end of said damping spring being attached to an upwardly extending beak formed by the linking piece or element of the sub-assembly.

In fact, the instantaneous centre of rotation of the front wheel is always located behind the axis of the rear wheel and below the horizontal plane containing the centre of gravity of the vehicle.

The self-contained nature of the sub-assemblies constituting the present motor bicycle allows, in particular, each one of said sub-assemblies to be adjusted in accordance with specific requirements, without it being necessary to take into account the other sub-assemblies while effecting such adjustments on a given sub-assembly, since each sub-assembly is capable, due to its design, of absorbing by itself the forces which are exerted on it by its various constituent elements.

The self-contained nature of the sub-assemblies obviously facilitates not only their adjustment, but also their manufacture, whereby the motor bicycle according to the invention lends itself particularly to be mass-produced.

Due to their self-contained structure, the sub-assemblies may furthermore be constructed in such a manner that they are between themselves interchangeable for example, one given type of front sub-assembly can be associated with central sub-assemblies (i.e. motors) of various HP ratings, while it is also possible to provide the latter with interchangeable rear sub-assemblies.

It will be understood that a great number of combinations can thus be achieved.

It is obvious that in the case of damage occurring to the vehicle, the repair work is greatly facilitated, as each of the sub-assemblies is directly accessible.

Furthermore, it has been shown that due to the design of the front wheel suspension, it is possible to displace rearwardly the portion of the travelling curve of the instantaneous centre of rotation, which corresponds to the displacement of the centre of the wheel with respect to the entire vehicle under the action of various loads.

The vehicle according to the invention comprises means for adjusting the length of the front wheel suspension arms, whereby the adjustment parameters can be modified easily and rapidly.

According to one feature of the invention the instantaneous centre of rotation of the front wheel is located behind the axis of the rear wheel and below the horizontal plane containing the centre of gravity of the motor bicycle.

In the present disclosure, the term "centre of gravity of the motor bicycle (or vehicle)" designates the "centre of gravity of the entirety constituted by the motor bicycle plus its driver."

The invention will be described in more detail hereinbelow with reference to the appended drawings which are given by way of illustration, but not of limitation.

Figure 6:
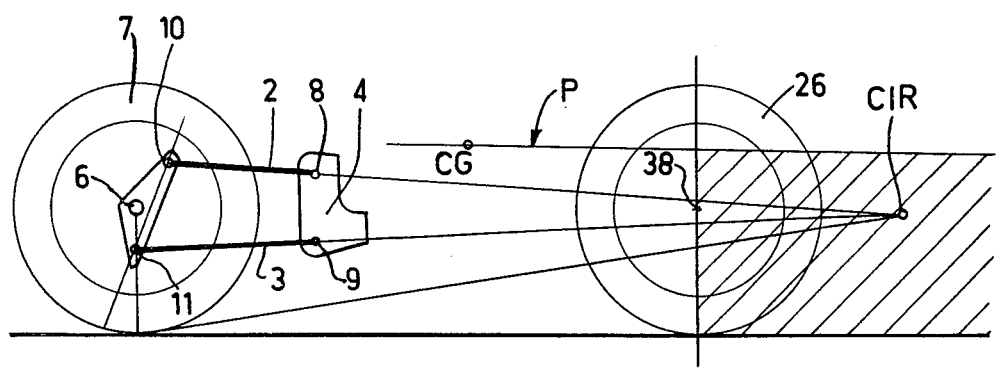

FIG. 6 schematically shows the adjustment of the front suspension of the motor bicycle according to the invention.

Figure 1:
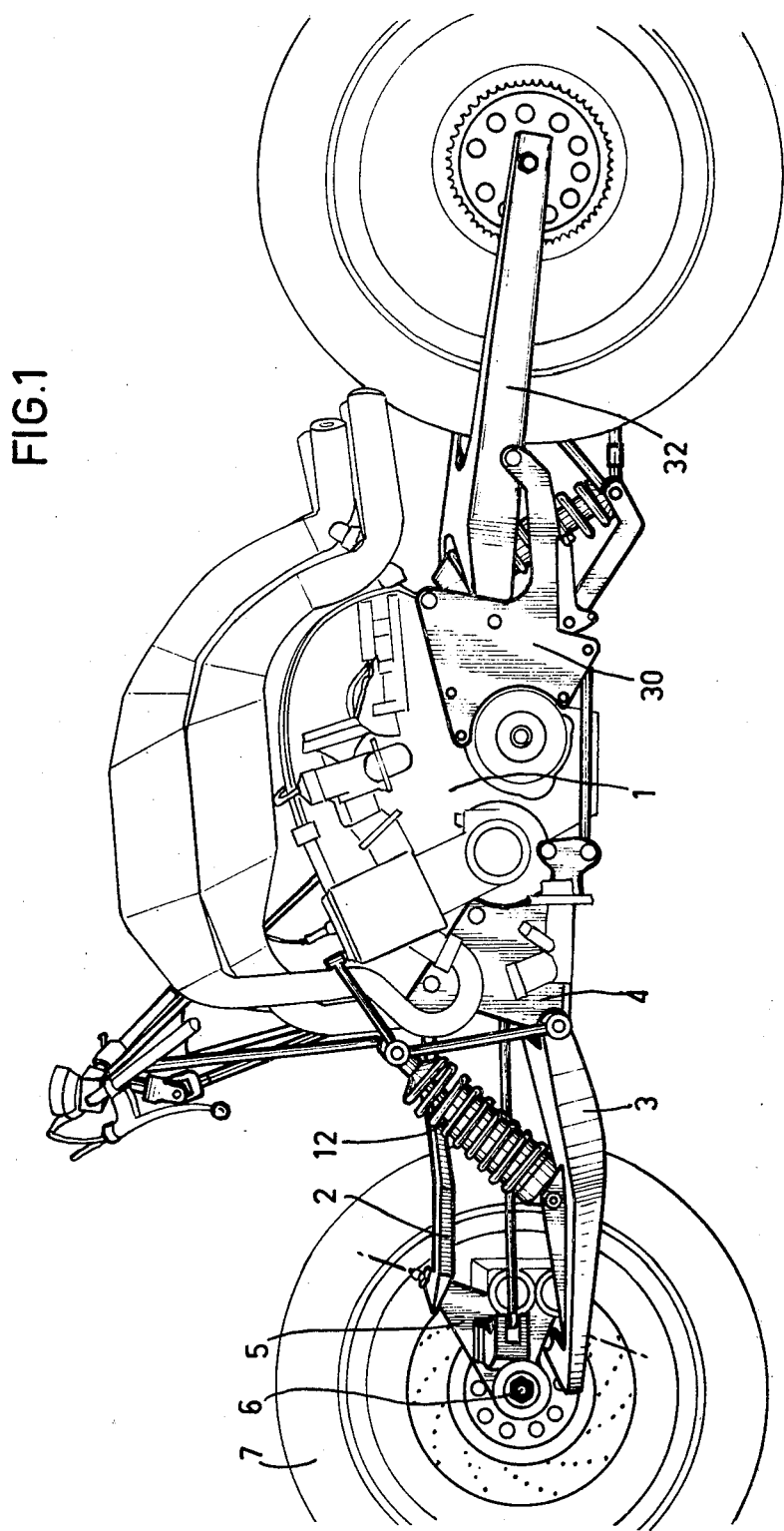
FIG. 1 shows a motor bicycle according to the invention, as seen from the left side.

The motor bicycle shown in FIG. 1 comprises a motor designated generally by reference numeral 1. In the present example, the motor is a transversely mounted four-cylinder in-line motor; it will be understood, however, that any other type of motor could also be used. At its front end the motor 1 is provided with a plate 4 integrally fixed on the motor; said plate can be replaced by any appropriate protuberance obtained directly when moulding the motor block.

Figure 2:
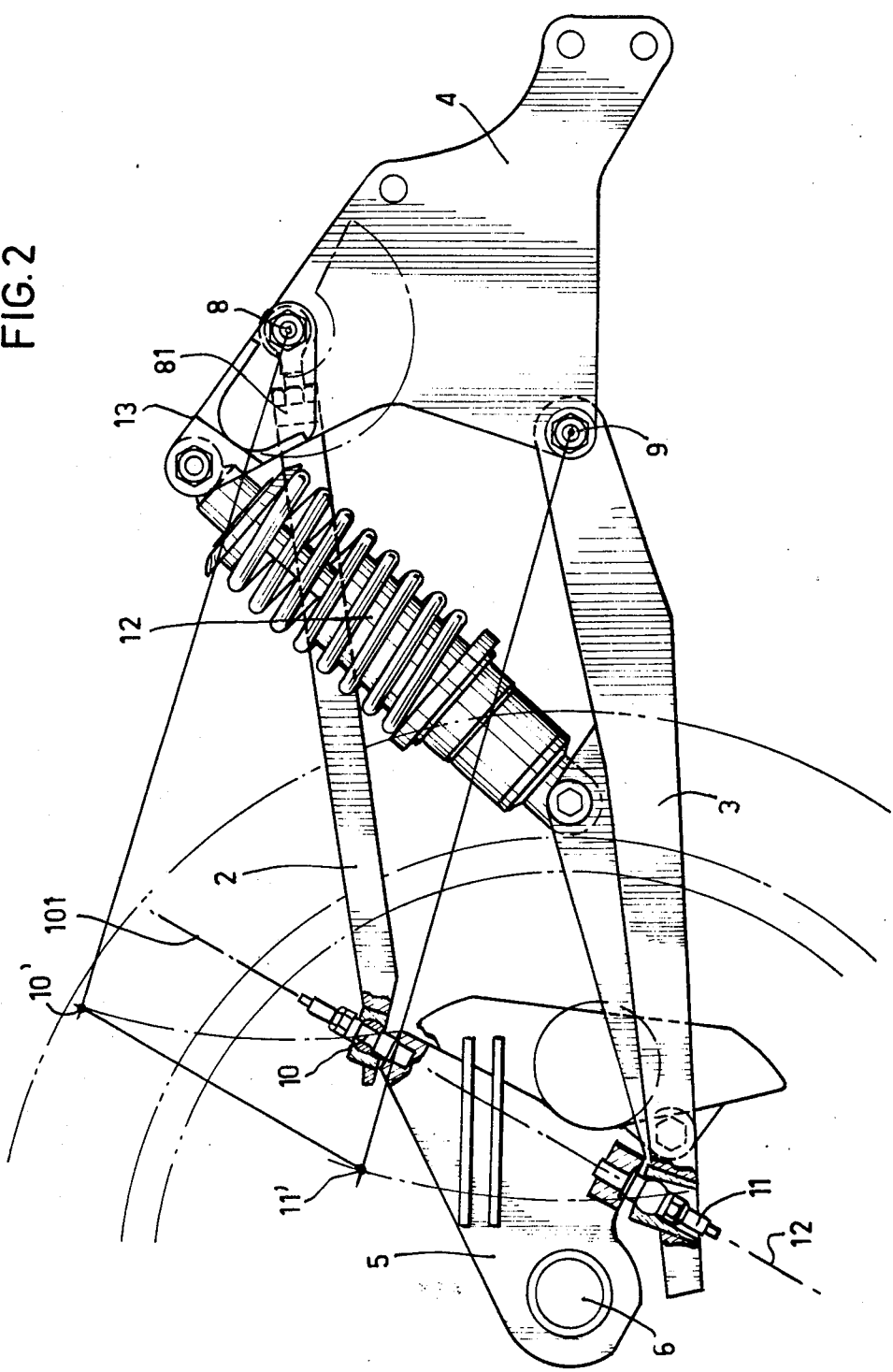
FIG. 2 is a schematic side-elevational view of the front suspension.

Said plate 4 supports two pivots 8 and 9 extending perpendicularly to the plane of the drawing shown in FIG. 2, two arms 2 and 3 being hingedly connected to said pivots in such a manner that said arms are able to effect a rotational motion about said pivots in a plane parallel to the plane of FIG. 2. The ends of these arms support pivots 10 and 11 having a common axis 101 about which pivots a triangular element 5 which supports the axle 6 of the front wheel 7. It will be seen that pivots 10 and 11 are able to carry out angular or rotational movements in the plane of FIG. 2, along circles the centres of which are defined by pivots 8 and 9, respectively, when the suspension enters into action.

FIG. 2 shows the suspension in its rest position wherein arms 2 and 3 are in their lowermost position. The Figure also shows, with an exaggerated angle of angular displacement, the position of the front wheel suspension when submitted to a heavy load. Under these conditions, pivots 10 and 11 are displaced to the locations designated by reference numerals 10' and 11', respectively; the arms are shown, in this position, by heavy lines extending between location 10' and pivot 8, on the one hand, and between location 11' and pivot 9, on the other hand. During this upwardly directed displacement of the arms, the acute angle formed by 11' axis 101 and the lower arm 3 tends to widen; this also applies to the distance between axle 6 and pivot 9. The trajection path followed by axle 6 during this displacement may be considered as being approximately circular, especially on account of the small value of the amplitude of the angular displacements of the suspension; the curve defined by this trajection path may thus be considered as constituting a segment of a circle. By appropriately selecting the respective locations of the above-mentioned elements 8, 9, 10 and 11, it is possible to define this circular curve in such a manner that its geometrical centre coincides with the rear wheel centre, and the radius of said circular curve, which constitutes at the same time a precise measure of the wheel-base of the vehicle, is then constant.

It is also possible to provide, between pivot 8 and arm 2, a rod member 81 bearing a screw, the length of which rod member is adjustable; such rod member can also be provided between arm 3 and pivot 9. Such arrangement is particularly advantageous in the case of experimental vehicles, because it allows the determination of definite parameters for production vehicles to be accelerated.

The front wheel suspension is maintained in its desired position by a damping spring 12 one end of which is attached to lever 3, and the other end of which is attached to an upwardly extending beak 13 formed by plate 4.

Figure 3:
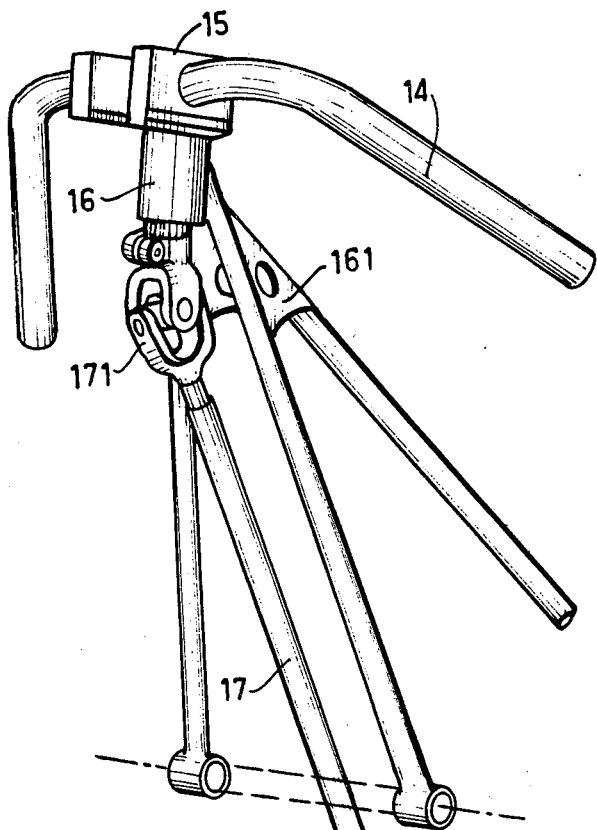
FIG. 3 is a schematic perspective view of the steering elements.
Figure 3:
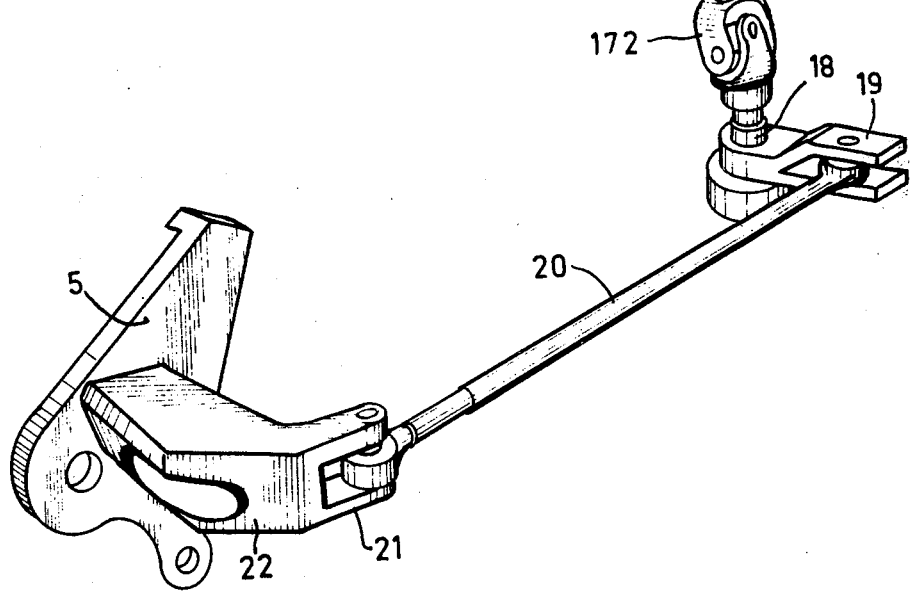

FIG. 3 shows the steering elements of the vehicle. These steering elements comprise a handle-bar 14, a bracket 15 having a vertical arm which is rotatably mounted in a tube 16 supported by a tripod 161 integrally connected to the upper part of motor 1, a substantially vertically extending control rod 17 attached by universal joints 171 and 172 to bracket 15, on the one hand, and, on the other hand, to the end of one arm of an angle-piece 18 the other arm of which forms a fork 19, a link member 20 each one of the ends of which is provided with an eye, the inside of each eye being provided with a ball-and-socket joint bushing and connected to a pivot extending through a fork 21 located at the end of a lever 22 integral with triangular element 5.

Figure 4:
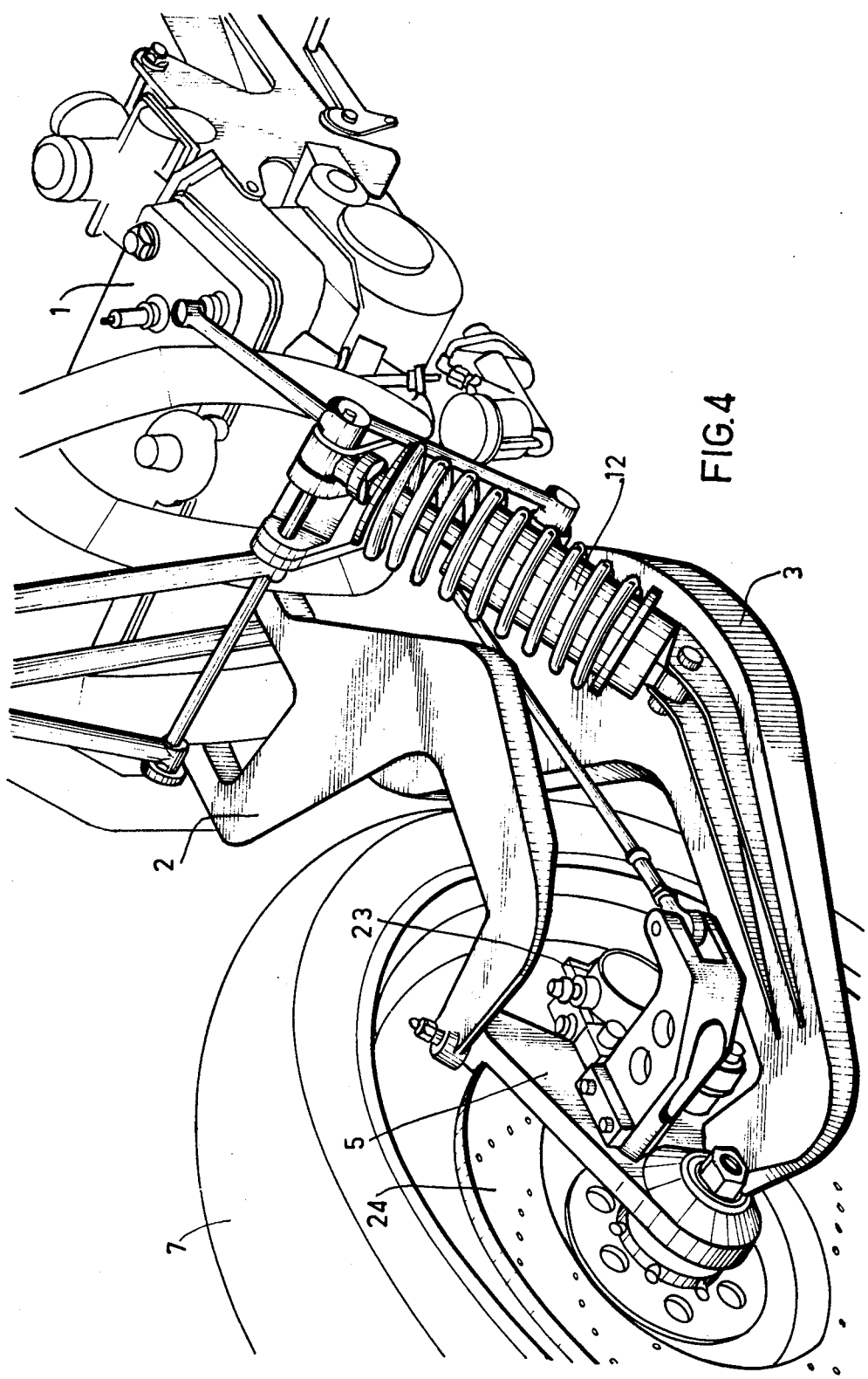
FIG. 4 shows, in perspective, the front wheel suspension and the front wheel brake.

FIG. 4 shows a braking device generally designated by reference numeral 23, which braking device, or brake control device 23 acts on a disc 24. Since the wheel 7 is mounted in an cantilevered position, disc 24 can be located in the median plane of said wheel.

Figure 5:
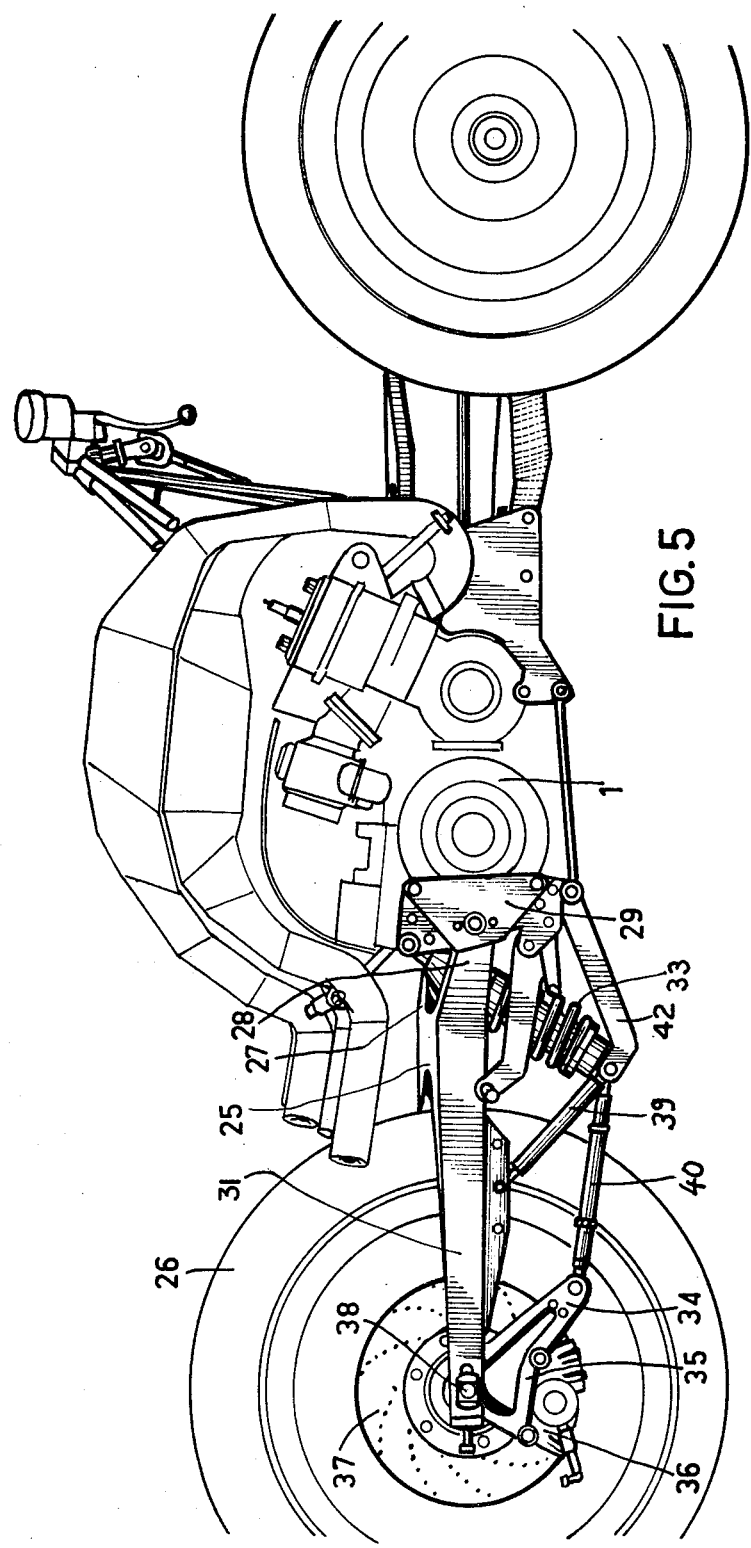
FIG. 5 shows the motor bicycle according to the invention as seen from the right side.

As shown in FIG. 5, fork 25 supporting rear wheel 26 is substantially H-shaped so as to define two arms 27, 28. As shown in FIGS. 5 and 1 respectively, the arms 27 and 28 are attached to linking pieces 29 and 30 integrally connected to the motor 1 or to bosses provided on motor 1, said fork 25 also defining two other arms 31, 32 which support the rear wheel hub; furthermore a damping spring 33 is provided, the upper end of which is attached to the upper part of the linking piece 29 integral with the motor, while the lower end of said spring is attached to one end of an arm 42 the other end of which is hingedly connected to the lower part of said linking piece 29; damping spring 33 also is connected to one end of a rod member 39 the other end of which is connected to fork 25. Furthermore, the lowermost end of damping spring 33 is connected through another rod member 40 to a beak extending forwardly from the plate 35 which supports the braking device 36 comprising a disc 37, said plate 35 being able to be angularly displaced about the rear wheel hub.

The instantaneous centre of rotation CIR of front wheel 7 (cf. FIG. 6)—which front wheel is suspended by arms 2 and 3 hingedly connected, respectively, to a triangular piece 6 supporting the wheel, and to plate 4 integral with the motor (not shown here)—is located behind the centre 38 of the rear wheel and below the vertical plane P containing the centre of gravity CG of the vehicle as defined herein-before.

Thus the instanteneous centre of rotation CIR is located within the hatched zone in FIG. 6, when the various elements of the vehicle according to the invention are properly adjusted, as described herein-above.

It will be noted that the vehicle or motor bicycle according to the invention is advantageous, i.a., in that its weight is very low with respect to its horse-power rating, and also in that its centre of gravity is considerably lower than that of all known motor bicycles; furthermore, the elimination of the frame and the fork will obviously result in a considerable reduction of the manufacturing cost of the vehicle. It should also be remembered that any reduction in the weight of a vehicle entails a correlative decrease of fuel consumption.

The invention is not limited to the embodiments shown and described; numerous modifications may be envisaged by those skilled in the art within the scope of the invention as defined in the appended claims.

What is claimed is:

1. A frameless two-wheeled motor vehicle comprising a motor assembly including a motor, a front assembly including a steerable front wheel having a horizontal axis, movable front linking means for linking said front assembly to said motor assembly, a rear assembly including a rear wheel, movable rear linking means for linking said rear assembly to said motor assembly, and a steering assembly linked to said front assembly and connected to said motor assembly, said front linking means comprising an upper front linking arm and a lower front linking arm substantially parallel to said upper front linking arm, each one of said front linking arms having a front end and a rear end, the rear ends of said front linking arms being pivotally mounted to said motor assembly about respective substantially horizontal parallel axes, the front end of each front linking arm being movably mounted by means of a ball-and-socket joint on a front supporting plate on which is also mounted, in a cantilever position, an axle for rotationally supporting said front wheel, a front damping spring having an upper end pivotally mounted to said motor assembly and a lower end pivotally mounted on said lower front linking arm, said steering assembly being linked to said front supporting plate, and a front wheel braking device mounted on said front supporting plate.

2. The vehicle according to claim 1, wherein said front ends of the front linking arms, which are mounted on said front supporting plate, are located on a common axis inclined with respect to the vertical and disposed in a plane perpendicular to the axis of said front wheel.

3. The vehicle according to claim 1, further comprising a braking disc integral with said front wheel and located substantially in the median plane thereof, said disc cooperating with said front wheel braking device.

4. A frameless two-wheeled vehicle according to claim 1, wherein said rear assembly comprises a substantially H-shaped fork member defining two front arms having respective front ends pivotally mounted on said motor assembly about a common transverse geometrical pivoting axis, said fork member further defining two rear arms respective rear ends of which support a hub and axle assembly of said rear wheel, said rear assembly further comprising a rear damping spring having an upper end hingedly mounted on said motor assembly about a horizontal hingeing axis located at a level about said geometrical pivoting axis, a lever member, a lower end of said rear damping spring being hingedly connected to one end to said lever member, the other end of said lever member being hingedly connected to said motor assembly at a level lower than that of said geometrical pivoting axis, a first rod member, said lower end of said rear damping spring also being hingedly connected to one end of a first rod member, the other end of said first rod member hingedly connected to said fork member.

5. The vehicle according to claim 4, further comprising a second rod member, said lower end of said rear damping spring being hingedly connected to one end of said second rod member, a rear supporting plate, the other end of said second rod member being hingedly connected to said rear supporting plate, a rear wheel braking device, said plate bearing said rear wheel braking device and being mounted on the rear wheel hub in such a manner that said rear supporting plate is able to be angularly displaced about said rear wheel hub.

6. A frameless two-wheeled vehicle according to claim 1 or 2 or 3 or 4, wherein said steering assembly comprises a handle-bar connected through rod members, pivoting joints and universal joints to said front supporting plate.

7. A frameless two-wheeled vehicle according to claim 1, or 2, or 3 or 4, wherein the dimensional and geometrical parameters of said front and rear assemblies are selected in such a manner that the instantaneous center of rotation of said front wheel is always located behind the axis of said rear wheel and below the horizontal plane containing the center of gravity of the vehicle.

8. A two-wheeled motor vehicle, comprising front and rear subassemblies directly attached to a central subassembly, said central sub-assembly comprising a motor, a linking member secured to said motor, and a gear-box;

said front sub-assembly comprising the front wheel of the vehicle, a front axle upon which said front wheel is rotationally mounted, front wheel suspension means, front wheel braking means, and front wheel steering means;

said rear sub-assembly comprising the rear wheel of the vehicle, a rear axle upon which said rear wheel is rotationally mounted, rear wheel suspension means, and rear wheel braking means, said rear wheel suspension means comprising (i) an H-shaped fork having two forward arms connected to said motor and two rearward arms for supporting said axle, (ii) an arm having one end pivotally connected to a lower part of said linking member, and another end, (iii) damping spring means having an upper end pivotally attached to an upper part of said linking member and a lower end pivotally attached to the other end of said arm, and (iv) a first rod member having one end pivotally connected to said lower end of said damping spring means and another end pivotally connected to at least one of the said rearward arms of said H-shaped fork.

9. The vehicle according to claim 8, further comprising (i) a plate for supporting at least a part of said rear wheel braking means, said plate having a region pivotally mounted for rotation about said rear axle and a forwardly extending beak remote from said region, and (ii) a second rod member having one end pivotally connected to the lower end of said damping spring means and another end pivotally connected to said beak.

* * * * *

UNITED STATES PATENT AND TRADEMARK OFFICE
CERTIFICATE OF CORRECTION

PATENT NO. : 4,265,329

DATED : May 5, 1981

INVENTOR(S) : Andre de Cortanze

It is certified that error appears in the above—identified patent and that said Letters Patent is hereby corrected as shown below:

Column 1, line 5: "wheel" should be --wheeled--.

line 32: "pasing" should be --passing--.

Signed and Sealed this

Twenty-ninth Day of September 1981

[SEAL]

Attest:

GERALD J. MOSSINGHOFF

Attesting Officer     Commissioner of Patents and Trademarks